United States Patent

Matsushima

[15] 3,682,488
[45] Aug. 8, 1972

[54] SEALING DEVICE
[72] Inventor: Akira Matsushima, Tokyo, Japan
[73] Assignee: Nippon Oil Seal Industry Co., Ltd., Kanagawa, Japan
[22] Filed: Sept. 10, 1970
[21] Appl. No.: 70,985

[30] Foreign Application Priority Data
Sept. 10, 1969 Japan.....................44/85614

[52] U.S. Cl. .........................277/37, 277/39, 277/58
[51] Int. Cl. ............................................B16d 53/00
[58] Field of Search.....................277/37, 38, 39, 58

[56] References Cited

UNITED STATES PATENTS

| | | | |
|---|---|---|---|
| 3,021,161 | 2/1962 | Rhoads et al. | 277/37 |
| 3,275,333 | 9/1966 | Scott et al. | 277/39 |
| 3,135,518 | 6/1964 | Carson et al. | 277/37 |
| 3,108,815 | 10/1963 | Haynie et al. | 277/37 |

Primary Examiner—William F. O'Dea
Assistant Examiner—P. D. Ferguson
Attorney—Holman & Stern

[57] ABSTRACT

An oil seal consists of an outer member having radial flanges at its axially opposite ends and an inner member having radial flanges at its axially opposite ends. One of the flanges of the outer member carries a resilient sealing lip in contact with the cylindrical portion of the inner member. Small clearances are provided between the flanges of the outer member and their respective adjacent flanges of the inner member. The inner diameter of the flanges of the outer member are smaller than the outer diameters of their respective adjacent flanges of the inner member. A thin resilient material is coated on the outer cylindrical surface of the outer member.

3 Claims, 2 Drawing Figures

INVENTOR,
AKIRA MATSUSHIMA
BY Holman & Stern
ATTORNEYS

SEALING DEVICE

BACKGROUND OF THE INVENTION

The present invention relates to sealing devices of the type which include inner and outer members capable of being disassembled and assembled, and which are particularly afficacious when used for the sealing of roller bearings fixed on a shaft which is subject to frequent assembly or disassembly.

In a known sealing device of this character, the axial ends of the inner and outer members abut the shoulder parts of the shafts and the housing with a substantial thickness of rubber therebetween. However, such a sealing device is disadvantageous in that an axial base plan for the positioning of the seal is difficult to set at the assembly and disassembly of the shaft, and such seal is impractical due to the considerable time required for the installation of the seal.

SUMMARY OF THE INVENTION

An object of the present invention is to provide sealing device of the assembly type which allows the assembly and disassembly of the bearing shaft without damage to the seal and at the same time eliminating the difficulties encountered by the use of conventional type seals.

The present seal includes a metal member mounted on one of the relatively rotating parts, comprising first and second radial flanges and an axial sleeve connecting such flanges, a second metal member mounted on the other of the two relatively rotating parts including radial flanges at the end thereof interconnected by an axial sleeve, with a flexible sealing lip contacting the surface of the axial sleeve of the first metal member and small radial clearances being provided between the flanges of the first and second members.

Further objects and advantages of the invention will become more readily apparent to persons skilled in the art from the following and and annexed drawings and in which drawings:

DETAILED DESCRIPTION OF THE SPECIFICATION

Figure 1:
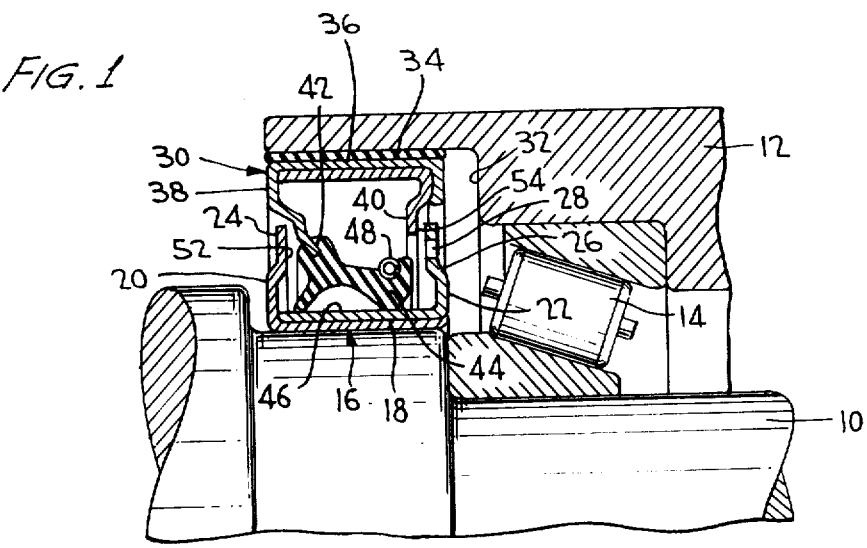
FIG. 1 is a fragmentary view partly in cross-section and partly in elevation of a sealing device embodying the present invention.

As disclosed in FIG. 1, a rotatable shaft 10 extends through a housing 12 and a bearing assembly 14 is located between the shaft and the housing. An inner member denoted generally 16 and of a general U-shape in cross-section is press-fitted onto the shaft 10. The member 16 includes a sleeve portion 18 and flanges 20 and 22 extending radially outward at the opposite ends of the sleeve portion, and having stepped inner ends as shown. The stepped inner and outer ends of the radial flanges of the outer and inner members provide small clearances therebetween for the purposes to be later explained and for the reinforcement of the flanges. When assembling, first the seal is press fitted on the shaft and, then the shaft, with the seal thereon, is inserted into the bore when the left side flanges of the inner and outer members are strongly pressed against each other with force tending to bend the flanges. Similarly, when disassembling, upon the shaft being pulled out of the bore, the right side flanges of the inner and outer members are strongly pressed against each other with a force tending to bend the flanges. The stepped ends of the flanges provide means to constructionally resist such forces. Without these stepped ends, the inner and outer members would have to be made from a heavier and thicker material to afford an equal mechanical strength which is, of course, disadvantageous. The flanges 20 and 22 are provided with steps 24 and 26, respectively, at radially outer positions and the flange 22 if formed with a plurality of small apertures 28, the purpose of which will be later described.

More particularly, the member 16 is formed by two components substantially L-shaped in section with long legs being overlapped or overlayed to constitute the sleeve portions 18 and the short legs the flanges 20 and 22.

An outer member indicated generally at 30 and of a general reverse U-shape in cross-section is press-fitted into a bore 32 of a housing 12 with a resilient member 34 of rubber-like material being interposed between the ring and the bore. The member 30 consists of a sleeve portion 36 and flanges 38 and 40 extending radially inwardly at the opposite ends of the sleeve portion. The flange 38, at its inner edge 42, is provided with a sealing lip 44 of suitable resilient material. The sealing lip is in engagement with outer surface 46 of the sleeve portion 18 of the member 16 and is compressed by a garter-type spring 48. It is to be noted that the inner diameters of the edge 42 and the flange 40 of the outer member 30 are smaller than the outer diameters of their respective adjacent steps 24 and 26 of the inner members 16.

As with the case with the member 16, the outer member 13 is defined by two components substantially L-shaped in cross-section, and the long legs thereof are overlapped to form the sleeve portion 36 with the short legs providing the radial flanges 38 and 40.

Figure 2:
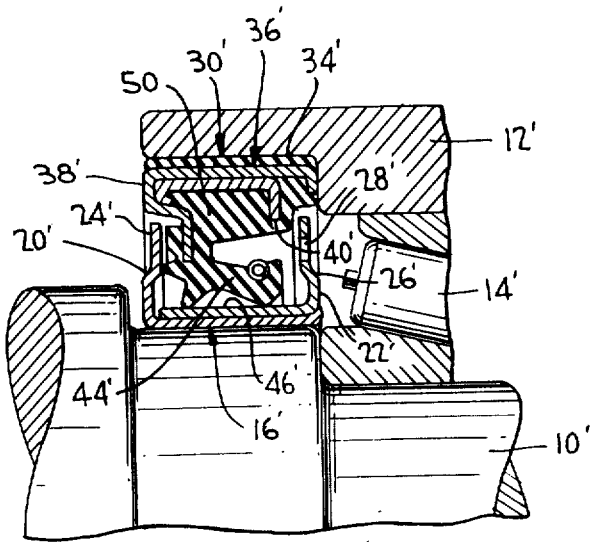
FIG. 2 is a view similar to FIG. 1 illustrating a further embodiment of the invention.

In the embodiment illustrated in FIG. 2, the same reference numerals are employed, except they are primed, and in this form, the flanges 38' and 40' are covered with a relatively thin coating of resilient material 50 which is integral with the sealing lip 44'. Similar to the embodiment of FIG. 1, the flanges 38' and 40' have inner diameters smaller than the outer diameters of the steps 24' and 26'.

In an assembled state, the inner and outer members 16 and 30 are positioned such that the metallic surfaces of the flanges 20 and 38 are on the same radial plane thereby providing small clearances or narrowed paths 52 and 54 between the stepped portion 24 and the flange 20 and its adjacent portion of the flange 40. In FIG. 2, such paths are provided between the steps 24' and 26' and there adjacent portions of the resilient material 50. (These clearances or paths serve as labyrinths to keep dust or other foreign matter out and lubricant in the seal.) The base plane for properly positioning the seal is set by the abutment of the metallic surface of the housing 12, 12' and the surface of the resilient coating 34, 34', or by the abutment of the metallic surfaces of the shaft 10, 10' and the inner member 16, 16'. The coating 34, 34' of rubber-like material on the outer surface of the sleeve portion 36, 36' functions to attain sealing and compensates for a possible eccentric installation of the outer member into the housing. Moreover, due to the fact that the metallic surfaces of the flanges 20, 20' and 30, 38' lie on the same radial plane in an assembled state, they are protected from possible mechanical damages in operation.

The small apertures 28 provided in the flange 22 of the inner member 16 serve for introducing a lubricant to the interior to avoid a dry lubrication in cases where the flanges 22 and 40 happen to contact each other, closing the space therebetween. It should further be pointed out that the steps 24 and 26 of the flanges 20 and 22 prevent damage of the sealing lip 44 by its contact with the inner side of the flanges.

This invention is not to be confined to any strict conformity to the showings in the drawings but changes or modifications may be made therein so long and such changes or modifications mark no material departure from the spirit and scope of the appended claims.

What is claimed is:

1. A sealing device for use between a housing bore and a shaft extending therethrough, including an outer annular metal member mounted in the bore, said outer member having radially inwardly extending flanges at its axially opposite ends thereby being generally of a reverse U-shape in cross-section, said flanges having stepped ends, and an inner annular metal member mounted on the shaft, said inner member having radially outwardly extending portions at its axially opposite ends thereby being generally of U-shaped in cross-section, the radially outwardly extending portions of the inner member having stepped outer ends for reinforcement of the radially inwardly extending flanges and said portions, one of said flanges carrying a resilient sealing lip in contact with the outer cylindrical surface of the inner member, the inner ends of the outer member being axially within the outer ends of the inner member and having inside diameters smaller than the outside diameters of their respective adjacent ones of the outer ends, the side of the flange carrying the resilient sealing lip and the side of its adjacent one of said portions being on the same radial plane, with small clearances being provided between the inner ends of the outer member and their respective adjacent ones of the outer ends of the inner member, and the outer cylindrical surfaces of the outer member having a thin coating of resilient material thereon whereby the shaft can be disassembled from inside the bore with said sealing device on the shaft.

2. The sealing device as claimed in claim 1 in which the flanges of the outer member are embedded in the resilient material integral with the resilient sealing lip with small clearances between the flanges and their respective adjacent part of the resilient material.

3. The sealing device as claimed in claim 1 in which one of said flanges of the inner member is provided with a small aperture to introduce lubricant to the resilient sealing lip.

* * * * *